(12) United States Patent
Okawara

(10) Patent No.: US 7,471,330 B2
(45) Date of Patent: Dec. 30, 2008

(54) LENS CONTROLLING APPARATUS AND IMAGE-TAKING APPARATUS WITH FOCUS CONTROL BASED ON FIRST AND SECOND SIGNALS DERIVED FROM DIFFERENT FOCUS CONTROL METHODS

(75) Inventor: Hiroto Okawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 11/061,839

(22) Filed: Feb. 18, 2005

(65) Prior Publication Data
US 2005/0185083 A1   Aug. 25, 2005

(30) Foreign Application Priority Data
Feb. 20, 2004   (JP)   ............... 2004-044758

(51) Int. Cl.
*H04N 5/232* (2006.01)
*G03B 13/00* (2006.01)
*G03B 13/20* (2006.01)
*G03B 17/00* (2006.01)

(52) U.S. Cl. .................. 348/353; 348/348; 396/80; 396/139

(58) Field of Classification Search ................. 348/345, 348/348, 349, 350, 351, 353, 354, 356; 396/79, 396/80, 121, 139
See application file for complete search history.

(56) References Cited

U.S. PATENT DOCUMENTS

| 4,518,242 A | 5/1985 | Toyama |
| 4,695,893 A | 9/1987 | Makino et al. |
| 4,998,124 A | 3/1991 | Ishida et al. |
| 5,597,999 A * | 1/1997 | Kinba et al. ............. 250/201.7 |
| 5,652,926 A | 7/1997 | Saito |
| 6,704,054 B1 * | 3/2004 | Hashimoto .................. 348/354 |
| 6,895,181 B2 * | 5/2005 | Nonaka et al. ............... 396/125 |
| 6,954,233 B1 * | 10/2005 | Ito ............................. 348/350 |
| 6,999,684 B2 * | 2/2006 | Sato et al. .................... 398/125 |

(Continued)

FOREIGN PATENT DOCUMENTS

| JP | 05-119250 | 5/1993 |
| JP | 2001-255451 | 9/2001 |

OTHER PUBLICATIONS

European Office Action date Jul. 17, 2006 issued in European Patent Application No. 05 003 414.9-1524.

*Primary Examiner*—John M Villecco
(74) *Attorney, Agent, or Firm*—Cowan, Liebowitz & Latman, P.C.

(57) ABSTRACT

A lens controlling apparatus is disclosed, which is capable of preventing an execution of irrelevant AF control in a combination of TV-AF method and an AF method other than the TV-AF method. The lens controlling apparatus comprises: a first signal generating section generating a first signal showing a contrast state of an object image on the basis of a predetermined frequency component of a signal; a second signal generating section generating a second signal by a focus detecting method different from that in the first signal generating section; and a controller, which selects one of a first focus control operation based on the first signal and a second focus control operation based on the second signal in accordance with each change amount of the first and second signals.

7 Claims, 13 Drawing Sheets

U.S. PATENT DOCUMENTS

| | | | |
|---|---|---|---|
| 7,116,903 B2* | 10/2006 | Taka | 396/125 |
| 7,209,175 B1* | 4/2007 | Kurokawa et al. | 348/345 |
| 7,301,579 B2* | 11/2007 | Shinohara et al. | 348/345 |
| 7,365,790 B2* | 4/2008 | Shinohara | 348/345 |
| 7,391,463 B2* | 6/2008 | Nonaka | 348/350 |
| 2001/0026683 A1* | 10/2001 | Morimoto et al. | 396/89 |
| 2003/0081137 A1* | 5/2003 | Yamazaki | 348/354 |
| 2004/0202461 A1* | 10/2004 | Nakahara | 396/104 |
| 2008/0198257 A1* | 8/2008 | Morimoto | 348/345 |
| 2008/0211957 A1* | 9/2008 | Ishikawa | 348/345 |

* cited by examiner

| | | DISTANCE CHANGE | |
|---|---|---|---|
| | | LARGE | SMALL OR ZERO |
| CHANGE OF TV-AF EVALUATION VALUE | LARGE | 1. DISTANCE CHANGES (PANNING, ETC.)<br>a) AF RESTART MODE<br>b) AF BY DISTANCE INFORMATION<br>→AF BY AF EVALUATION VALUE | 2. CONTRAST CHANGES (NO DISTANCE CHANGE)<br>a) AF COMFIRM MODE AT VICINITY OF CURRENT FOCUS POSITION<br>b) AF BY DISTANCE INFORMATION (UNTIL STABILIZATION OF AF EVALUATION VALUE)<br>→AF BY AF EVALUATION VALUE |
| | SMALL OR ZERO | 3. AF EVALUATION VALUE LEVEL IS HIGH AND PARALLAX STATE<br>a) AF RESTART MODE<br>b) AF BY AF EVALUATION VALUE<br>4. AF EVALUATION VALUE LEVEL IS LOW AND DISTANCE TO LOW CONTRAST OBJECT CHANGES<br>a) AF RESTART MODE<br>b) AF BY DISTANCE INFORMATION | 5. NO DISTANCE CHANGE AND NO CONTRAST CHANGE<br>a) POSITION HOLD MODE |

FIG. 2

LENS CONTROLLING APPARATUS AND IMAGE-TAKING APPARATUS WITH FOCUS CONTROL BASED ON FIRST AND SECOND SIGNALS DERIVED FROM DIFFERENT FOCUS CONTROL METHODS

FIELD OF THE INVENTION

The present invention relates to lens controlling apparatuses used for image-taking apparatus such as video cameras.

BACKGROUND OF THE INVENTION

In video cameras, a so-called TV-AF method is recently a standard method for focus control, in which an AF evaluation value signal is generated based on sharpness (a contrast state) of images detected from video signals obtained by photoelectrical conversion of an object image with an image-pickup element, and then focus control is performed so that a position of a focus lens, where the AF evaluation value signal may become maximum, is searched.

Generally, a high frequency component extracted from the video signals is used as the AF evaluation value signal in the TV-AF method. The AF evaluation value signal becomes larger as the position of the focus lens approaches an in-focus point (in-focus position) when taking an image of a normal object, as shown in FIG. 2. The position where the level (value) of the AF evaluation value signal reaches the maximum is the in-focus point.

Moreover, there is an internal phase difference detecting method as another AF method, in which a luminous flux that have passed through a pupil of an image-taking optical system is divided into two luminous fluxes, and a pair of focus detecting sensors (line sensors) receive the two luminous fluxes, respectively. An out-of-focus amount and an out-of-focus direction can be directly calculated based on a displacement amount between signals output according to the light-receiving amounts of the sensors, that is, relative positional displacement amount of the luminous fluxes in the dividing direction thereof.

By the use of this method, the out-of-focus amount and the out-of-focus direction can be obtained if an accumulation operation in the focus detecting sensor is performed once. Therefore, a high-speed focus adjustment operation becomes possible.

Moreover, there is an external distance-measuring method using a distance-measuring sensor that is independent of the image-taking lens. In this method, a luminous flux from an object is divided into two luminous fluxes, and two focus detecting sensors receive the two luminous fluxes respectively. A displacement amount between signals output according to the light-receiving amounts of the sensors, that is, a relative positional displacement amount of the luminous fluxes in the dividing direction thereof, is detected, and an object distance is calculated by triangulation.

There are other methods using an external distance-measuring sensor such as a method in which an object distance is measured based on a transmission speed of ultrasonic waves detected by an ultrasonic sensor, and a method in which an object distance is measured by triangulation using an infrared sensor.

Furthermore, an AF method as a combination of the TV-AF method and an AF method other than the TV-AF method has been proposed, in which, for instance, a focus lens is moved to the vicinity of an in-focus point by the internal phase difference detecting method, and then moved to the in-focus point more accurately by the TV-AF method (see Japanese Laid-Open Patent Application No. H05-64056).

However, the TV-AF method includes the following disadvantages. First, since the AF evaluation value signal is generated from video signals, the AF evaluation value signal may fluctuate according to the changes of objects and image-taking conditions. In this case, the focus lens may be driven in a false direction (in a direction away from the in-focus point) because of the misjudgment of an in-focus direction.

Moreover, in a case where, from a state in which the image-taking optical system has focused on a certain distance object, the object moved out of an image-taking area, if the AF evaluation value for an out-of-focus object that does not exist at the certain distance is equal to the AF evaluation value for the certain distance object, the AF operation may not be restarted, and therefore out-of-focus images may be taken continuously.

In the combination of the TV-AF method and an AF method other than the TV-AF method, the focus lens is moved to the vicinity of the in-focus point by an AF method other than the TV-AF method, and the AF method is then changed to the TV-AF method only when the AF evaluation value is larger than a predetermined level (when the focus lens is within an in-focus range) to move the focus lens to the in-focus point.

However, in a case where the AF evaluation value has changed by the change of the object's contrast despite in a state in which the object distance has not changed, the focus state may change because of the operation of the TV-AF in the image-taking condition requiring no movements of the focus position originally, and unnecessary image blur may be generated.

Such an unnecessary TV-AF operation is allowable in an image-taking apparatus in which image recording is not performed during the AF operation. However, in an image-taking apparatus in which video image recording is also performed during the AF operation, image blur caused by the unnecessary TV-AF operation will be recorded.

Furthermore, if the AF method with the external distance-measuring sensor, which is an AF method other than the TV-AF method, is adopted, parallax between the image-taking area of the image-taking lens and the distance-measuring area of the distance-measuring sensor may be generated. In this case, the focus lens may move according to the change of the object distance detected by the external distance-measuring sensor though it is in an in-focus state, and image blur may occur.

SUMMARY OF THE INVENTION

An object of the present invention is to provide a lens controlling apparatus capable of preventing an execution of irrelevant AF control caused by the changes of objects and image-taking conditions in a combination of the TV-AF method and an AF method other than the TV-AF method, and to provide an image-taking apparatus with the same.

One aspect of the present invention is a lens controlling apparatus, which performs a focus control operation for an image-taking optical system, comprising: a first signal generating section, which generates a first signal showing a contrast state of an object image on the basis of a predetermined frequency component of a signal obtained by using an image-pickup element that photoelectrically converts the object image; a second signal generating section, which generates a second signal by a focus detecting method different from that in the first signal generating section; and a controller, which selectively performs a first focus control operation based on the first signal and a second focus control operation based on the second signal. The controller selects one of the first and second focus control operations in accordance with each change amount of the first and second signals.

Another aspect of the present invention is a lens controlling apparatus, which performs focus control for a focus lens included in an image-taking optical system, comprising: a first signal generating section, which generates a first signal showing a contrast state of an object image on the basis of a predetermined frequency component of a signal obtained by using an image-pickup element that photoelectrically converts the object image; a second signal generating section, which generates a second signal by a focus detecting method different from that in the first signal generating section; and a controller, which selectively performs a first focus control operation based on the first signal and a second focus control operation based on the second signal. The controller selects whether to drive the focus lens by at least one of the first and second focus control operations or to stop the drive of the focus lens in accordance with each change amount of the first and second signals.

Another aspect of the present invention is a lens control program, which executes in a computer and performs a focus control operation for an image-taking optical system, comprising: a first step of generating a first signal showing a contrast state of an object image on the basis of a predetermined frequency component of a signal obtained by using an image-pickup element that photoelectrically converts the object image; a second step of generating a second signal by a focus detecting method different from that in the first step; and a third step of selectively performing a first focus control operation based on the first signal and a second focus control operation based on the second signal. The third step selects one of the first and second focus control operations in accordance with each change amount of the first and second signals.

Still another aspect of the present invention is a lens control program, which executes in a computer and performs a focus control operation for a focus lens included in an image-taking optical system, comprising: a first step of generating a first signal showing a contrast state of an object image on the basis of a predetermined frequency component of a signal obtained by using an image-pickup element that photoelectrically converts the object image; a second step of generating a second signal by a focus detecting method different from that in the first step; and a third step of selectively performing a first focus control operation based on the first signal and a second focus control operation based on the second signal. The third step selects whether to drive the focus lens by at least one of the first and second focus control operations or to stop the drive of the focus lens in accordance with each change amount of the first and second signals.

Other objects and further features of the present invention will become readily apparent from the following description of the preferred embodiments with reference to accompanying drawings.

BRIEF DESCRIPTION OF THE DRAWINGS

FIG. 2 is a classification table of image-taking scenes.

DETAILED DESCRIPTION OF THE PREFERRED EMBODIMENTS

A description will now be given of the preferred embodiments of the present invention by referring to the accompanying drawings.

Embodiment 1

Figure 1:
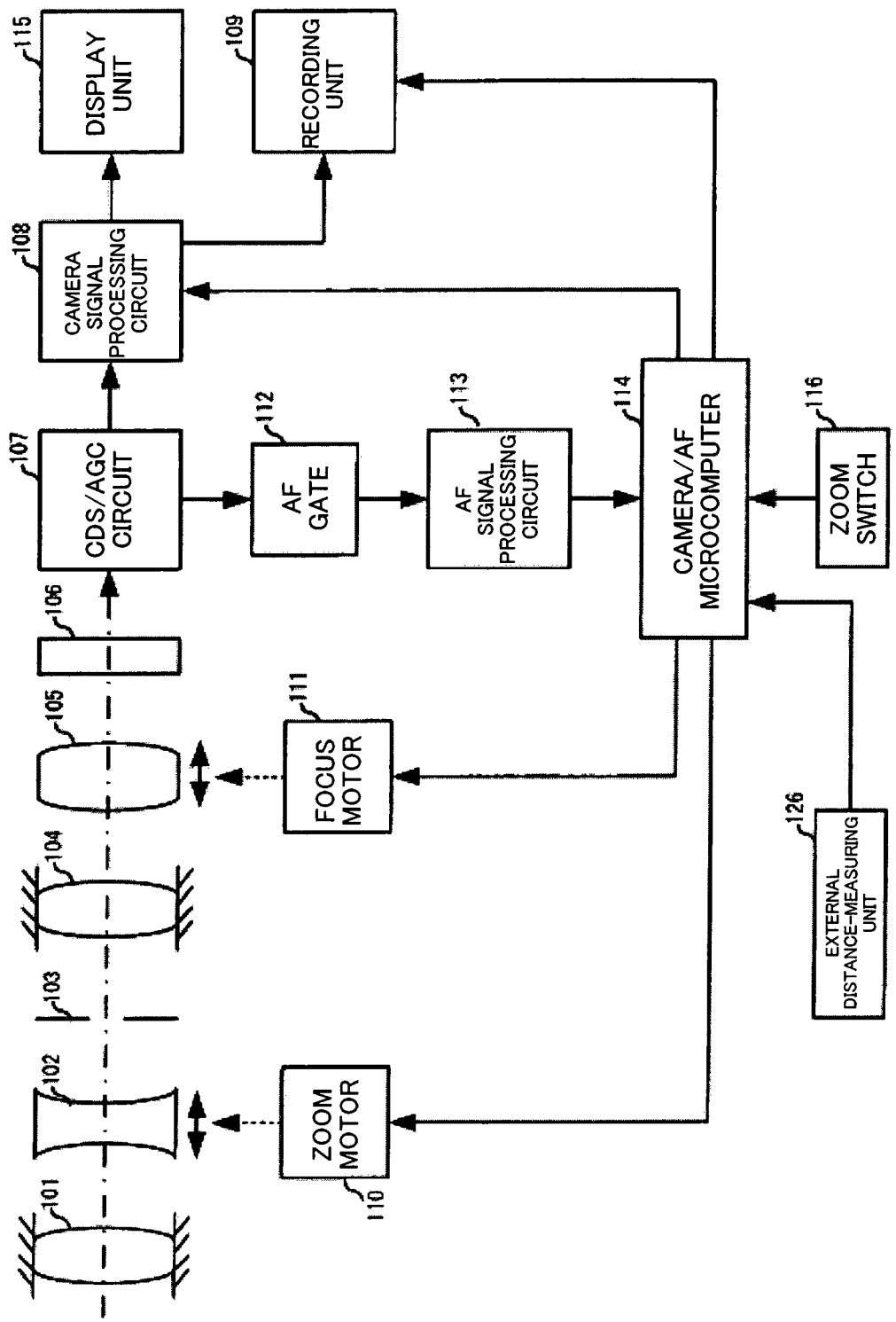
FIG. 1 is a block diagram showing the structure of a video camera that is Embodiment 1 of the present invention.

FIG. 1 shows the structure of a video camera as an image-taking apparatus that is Embodiment 1 of the present invention. In FIG. 1, in order from an object side (the left side in the figure), the reference numeral 101 denotes a fixed first lens unit, 102 denotes a magnification-varying lens unit for varying the magnification, 103 denotes a stop, 104 denotes a fixed second lens unit, and 105 denotes a focus/compensator lens unit (hereinafter, it is referred to as a focus lens unit) for correcting an image plane fluctuation with a variation of magnification and focusing. An image-taking optical system (hereinafter, it is referred to as an image-taking lens) is constituted by these lens units and the stop.

The actual each lens unit can be constituted by a plurality of lenses though each lens unit in the figure seems to be constituted by a single lens.

In the embodiment, a video camera with an image-taking lens will be explained. However, the present invention can be applied to a video camera on which an image-taking lens can detachably mount.

The reference numeral 106 denotes an image-pickup element such as a CCD sensor and a CMOS sensor, and 107 denotes a CDS/AGC circuit that samples outputs from the image-pickup element 106 and performs gain adjustment. The reference numeral 108 denotes a camera signal processing circuit that processes video signals that are output signals from the CDS/AGC circuit 107 so that they become signals corresponding to an after-mentioned recording unit 109.

The recording unit 109 records the signals processed by the camera signal processing circuit 108 to recording medium such as magnetic tapes, semiconductor memories and optical discs.

The reference numeral 110 denotes a zoom motor that drives the magnification-varying lens unit 102, 111 denotes a focus motor that drives the focus lens unit 105.

The reference numeral 112 denotes an AF gate that passes only a signal component used for focus detection among the video signals from the CDS/AGC circuit 107. The reference numeral 113 denotes an AF signal processing circuit that is a first signal generating section, which extracts a predetermined high-frequency component from the signals that have output from the CDS/AGC circuit 107 and generates an AF evaluation value signal that is a first signal based on the high-frequency component. The AF evaluation value signal shows a contrast state of an object image formed by the image-taking lens.

The reference numeral 114 denotes a camera/AF microcomputer (hereinafter, it is merely referred to as a microcomputer), which is a controller, that controls the focus motor 111 for driving the focus lens unit 105 based on the AF evaluation value signal output from the AF signal processing circuit 113 and a distance signal, which is a second signal, that output from an external distance-measuring unit 126, described later. The microcomputer 114 controls the image-pickup element 106, CDS/AGC circuit 107, camera signal processing circuit 108, AF signal processing circuit 113, the recording unit 109 and the like.

The reference numeral 115 denotes a display unit that displays video images corresponding to the output signals from the camera signal processing circuit 108. A user can see the taken video images through the display unit 115. The reference numeral 116 denotes a zoom switch. The microcomputer 114 controls the motors 110 and 111 in accordance with the operation of the zoom switch 116, and thereby driving the magnification-varying lens unit 102 and the focus lens unit 105 for zooming.

The external distance-measuring unit 126, which is a second signal generating section, measures a distance to the object, and outputs a distance-measuring signal according to the measured distance. The external distance-measuring unit 126 can employ any external distance-measuring method such as an external phase difference detecting method, ultrasonic sensor method and infrared sensor method and the like.

Next, the AF control that is performed by the microcomputer 114 will be explained. The microcomputer 114 in this embodiment determines a current image-taking situation based on the AF evaluation value signal (hereinafter, it is referred to as an AF evaluation value, too) obtained by the TV-AF method (AF signal processing circuit 113) and the distance signal (hereinafter, it is referred to as distance information, too) obtained by the external distance-measuring method (external distance-measuring unit 126), and selects an AF operation method that is optimal for the current image-taking situation. This AF control can achieve focusing that matches the user's intention and an AF function without false operations.

Specifically, the microcomputer 114 determines the image-taking situation according to the change amount of the object distance, the change amount of the AF evaluation value and the level (value) of the AF evaluation value as shown in the table of FIG. 2, and optimizing the AF method and transition of AF processing states.

More specifically, the microcomputer 114 controls the selection of the AF method and the transition of AF processing states (transition of AF modes) so as to compensate weaknesses of the TV-AF method such as:

1) the microcomputer 114 cannot judge whether the object distance has changed or the object's contrast has changed;

2) the microcomputer 114 cannot judge whether the object has a low contrast or it is an out-of-focus state, and so as to reduce affects of parallax in the external distance measuring method such as:

3) the microcomputer 114 detects the distance to an object other than the main object because of the difference between the sensing angle of the external distance measuring sensor and viewing angle of the image-taking lens.

A classification table of five image-taking scenes is described in the table of FIG. 2. Hereinafter, a determination method of image-taking scenes, and the transition of AF modes and the selection of the AF processing method (TV-AF method or external distance measuring method) in each scene will be explained using the table.

[Scene 1]

This scene 1 is an assumed scene in which the object distance changes with panning, tilting or the like. In this scene, it is necessary to perform the AF control at once for obtaining an in-focus state.

The judgment condition of this scene is that the fluctuation of the AF evaluation value is large and the fluctuation of the distance information is also large.

In this scene, the microcomputer 114 sets a restart mode for the AF mode, and sets a combination method for the AF method, in which rapid focusing is performed by the use of the external distance measuring method and then performed more accurate focusing by the use of the TV-AF method.

[Scene 2]

This scene 2 is an assumed scene in which the contrast of an equidistant object changes. In this scene, the microcomputer 114 maintains the current position of the focus lens unit 105 or drives it within a range in which the in-focus state may be kept for the slight change of the object distance based on the current position of the focus lens unit 105 without unconsidered drive or large drive of the focus lens unit 105.

The judgment condition of this scene is that the fluctuation of the AF evaluation value is large and the fluctuation of the distance information is zero or very small.

In this scene, the microcomputer 114 sets an in-focus confirmation mode for the AF mode, and sets a combination method for the AF method, in which focusing is performed so as to follow the slight change of the distance information by the use of the external distance measuring method while the AF evaluation value is changing, and performed so as to reconfirm the in-focus state by the use of the TV-AF method after the AF evaluation value has become stable. Since the distance information is generally stable during focus-following, the position of the focus lens unit 105 (hereinafter, it is referred to as a focus position) is maintained.

[Scene 3]

This scene 1 is an assumed scene in which the parallax is generated between the sensing angle of the external distance-measuring sensor 126 and the viewing angle of the image-taking lens. In this scene, the microcomputer 114 performs the AF control operation based on the AF evaluation value of the TV-AF without using the distance information from the external distance-measuring sensor 126.

The judgment condition of this scene is that the fluctuation of the AF evaluation value is zero or very small and the level of the AF evaluation value is high, and the fluctuation of the distance information is large.

In this scene, the microcomputer 114 sets the restart mode for the AF mode, and sets the TV-AF method for the AF method.

[Scene 4]

This scene 4 is an assumed scene in which the object has a low contrast, and the object distance changes with panning or the like. In this scene, it is necessary to perform the AF control at once for obtaining an in-focus state. However, so-called hunting may occur because the level of the AF evaluation value is low, and an AF evaluation value for the determination of the in-focus state cannot be obtained.

The judgment condition of this scene is that the fluctuation of the AF evaluation value is zero or very small and the level of the AF evaluation value is low, and the fluctuation of the distance information is large.

In this scene, the microcomputer 114 sets the restart mode for the AF mode, and sets a combination method for an AF method to in which focusing is performed so as to follow the change of the distance information by the use of the external distance measuring method while the AF evaluation value is low, and performed so as to confirm the in-focus state by the use of the TV-AF method after the AF evaluation value has become high.

[Scene 5]

This scene 1 is an assumed scene in which the object distance and the contrast of the object do not change, and the video camera is supported with a tripod or the like. In this scene, it is necessary to maintain the in-focus position.

The judgment condition of this scene is that the fluctuation of the AF evaluation value is zero or very small, and the fluctuation of the distance information is zero or very small.

In this scene, the microcomputer 114 sets a mode for the AF mode, in which the current focus position is maintained, and sets an AF lock state, in which the microcomputer 114 do not select the AF method until the next change of the scene.

Figure 3A:
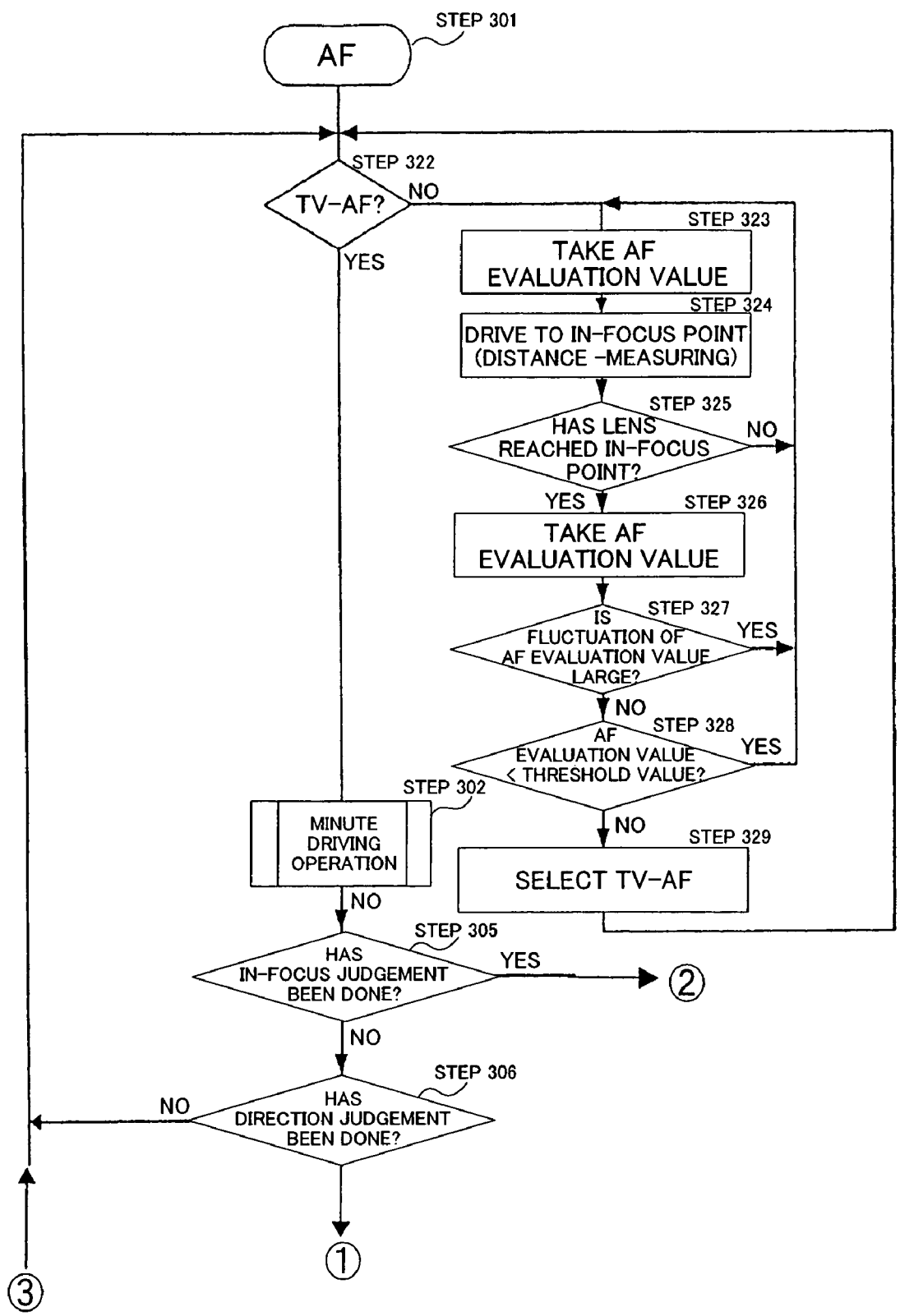
FIGS. 3A and 3B are flowcharts showing AF control in the video camera of Embodiment 1.
Figure 3B:
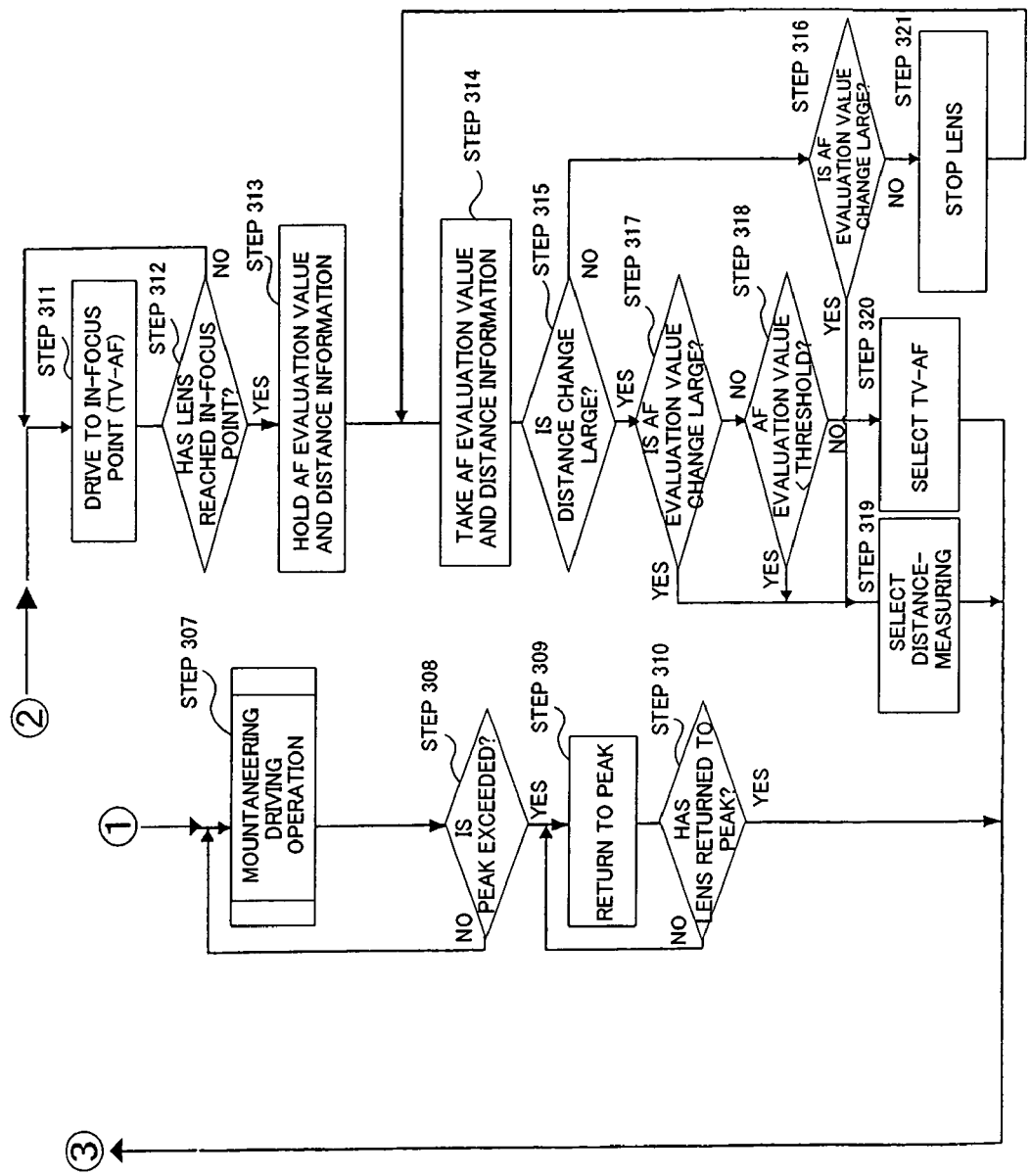

The process according to a focus control program in the microcomputer 114 will be explained, which determines one of the above-mentioned five representative scenes and performs the AF control, using a flowchart in FIGS. 3A and 3B (hereinafter, they are referred to as FIG. 3).

First, the microcomputer 114 starts the process in accordance with the application of power in Step 301, and selects a primary signal for the AF control in Step 322. In other words, the microcomputer 114 selects the AF method (whether to perform the AF control by the TV-AF method, which is the first focus control operation, or to perform the AF control by the external distance-measuring method, which is the second focus control operation). The selection is performed based on the results of Steps 319, 320 and 329, described later, the external distance-measuring method being selected as the default setting at the time of the application of power.

The process progresses to the Step 302 if the TV-AF method has been selected, and to the Step 323 if the external distance-measuring method has been selected.

In Step 302, the microcomputer 114 performs a 'minute drive operation' of the TV-AF method, judges whether it is the in-focus state or not, and judges which direction the in-focus point is in if it is not the in-focus state. After that, the microcomputer 114 progresses to Step 305. The 'minute drive operation' will be explained below.

In Step 305, the microcomputer 114 judges whether an in-focus judgment has been done in Step 302. The process progresses to Step 311 if the in-focus judgment has been done, and the microcomputer 114 performs an 'in-focus/restart judging process'. The process progresses to Step 306 if the in-focus judgment has not been done.

In Step 306, the microcomputer 114 judges whether the direction judgment has been done in Step 302, and the process progresses to Step 307 if the direction judgment has been done. On the other hand, the process returns to Step 302 via Step 322 if the direction judgment has not been done; the microcomputer 114 continues the 'minute drive operation'.

In Step 307, the microcomputer 114 performs a 'mountaineering drive operation' for the focus lens unit 105 at a predetermined speed. The 'mountaineering drive operation' will be explained below.

In Step 308, the microcomputer 114 judges whether the AF evaluation value exceeds the peak in the 'mountaineering drive operation' in Step 307 or not. The relation between the AF evaluation value and the position of the focus lens unit 105 is shown in FIG. 4.

Figure 4:
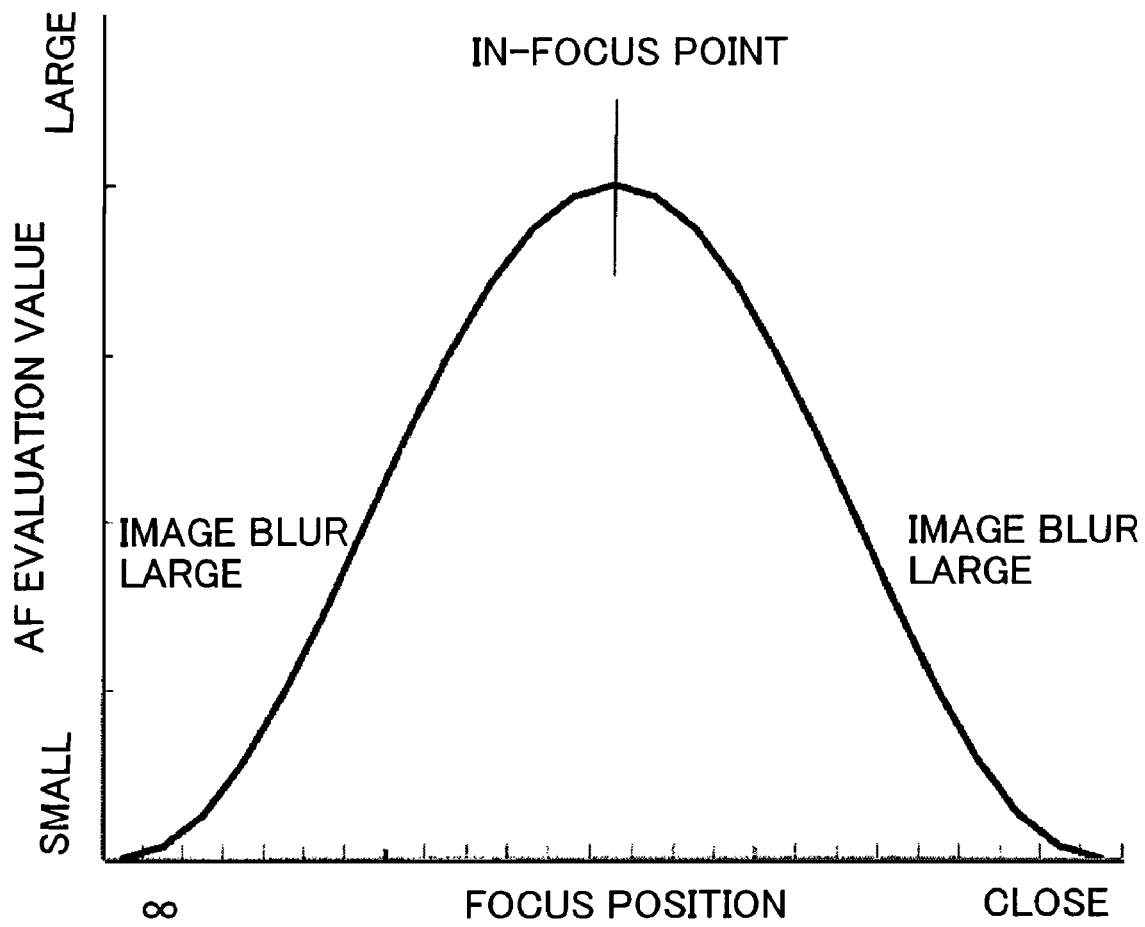
FIG. 4 is a graph showing a relation between AF evaluation values and positions of a focus lens unit.

In FIG. 4, the focus position where the AF evaluation value becomes the peak is the in-focus point, and image blur becomes larger and the AF evaluation value becomes lower as the focus position moves to the infinite side and the close side from there. After the focus lens unit 105 was driven in a direction in which the AF evaluation value became larger in the 'mountaineering drive operation' as shown by the solid arrow in FIG. 5, an AF evaluation value smaller than the previous AF evaluation value shows that the previous AF evaluation value was the peak (that is, the AF evaluation value has exceeded the peak). Therefore, the focus lens unit 105 can be located at the in-focus point by returning it to the previous position.

The process progresses to Step 309 if the microcomputer 114 judged that the AF evaluation value has exceeded the peak. On the other hand, the process returns to Step 307 if the microcomputer 114 judged that the AF evaluation value has not exceeded the peak; the microcomputer 114 continues the 'mountaineering drive operation'.

In Step 309, the microcomputer 114 returns the focus lens unit 105 to the position where the AF evaluation value becomes the peak.

In Step 309, the microcomputer 114 judges whether the focus lens unit 105 has returned to the position where the AF evaluation value becomes the peak (in-focus point) or not. The process returns to Step 302 via Step 322 if the focus lens unit 105 has returned to the in-focus point; the microcomputer 114 performs the 'minute drive operation' again. The process returns to Step 309 if the focus lens unit 105 has not returned to the in-focus point; the microcomputer 114 continues the operation for returning the focus lens unit 105 to the in-focus point.

Next, the 'in-focus/restart judging process' from Step 311 will be explained.

First, in Step 311, the microcomputer 114 drives the focus lens unit 105 to the judged in-focus point.

In Step 312, the microcomputer 114 judges whether the focus lens unit 105 has reached the in-focus point or not, and the process progresses to Step 313 if the focus lens unit 105 has reached the in-focus point. On the other hand, the process progresses to Step 311 if the focus lens unit 105 has not reached the in-focus point.

In Step 313, the microcomputer 114 holds the AF evaluation value and the distance information from the external distance-measuring unit 126 at the in-focus point. Next, in Step 314, the microcomputer 114 takes the latest AF evaluation value and distance information.

In Step 315, the microcomputer 114 compares the previous distance information that was held in Step 313 with the latest (current) distance information that was taken in Step 314, and judges whether the difference between them, that is, the change amount of the distance information, which is the second signal, is larger than a predetermined amount (second predetermined amount) or not. This judgment can be a judgment of whether the change amount is larger or smaller than a predetermined value as one value, and can be a judgment of whether the change amount is larger than the upper limit or smaller than the lower limit of a range having a certain width. If the change amount of the distance information is larger than the above-mentioned predetermined amount, the process progresses to Step 315.

Next, in Step 317, the microcomputer 114 compares the latest (current) AF evaluation value that was taken in Step 314 with the previous AF evaluation value that was held in Step 313, and judges whether the difference between them, that is, the change amount of the AF evaluation value, which is the first signal, is larger than a predetermined amount (first predetermined amount) or not. This judgment may also be a judgment of whether the change amount is larger or smaller than a predetermined value as one value, and may be a judgment of whether the change amount is larger than the upper limit or smaller than the lower limit of a range having a certain width.

If the change amount of the AF evaluation value is larger than the above-mentioned predetermined amount, the process progresses to Step 319. In Step 319, the microcomputer 114 sets the external distance-measuring method for the AF method in the next AF control operation, and the process returns to Step 322. In this case, the process progresses from Step 322 to Step 323; the AF mode changes to the 'restart mode'. The process in this case corresponds to a process for the above-mentioned scene 1. On the other hand, if the change amount of the AF evaluation value is smaller than the predetermined amount, that is, zero or very small in Step 317, the process progresses to Step 318. In Step 318, the microcomputer 114 judges whether the level of the current (latest) AF evaluation value taken in Step 314 is smaller than a predetermined threshold or not. The case that the AF evaluation value is smaller than the threshold corresponds to the scene 4, in which the distance to the low contrast object was changed. In this case, the process progresses to Step 319; the AF mode changes to the 'restart mode'.

The case that the AF evaluation value is larger than the threshold corresponds to the scene 3, in which there is a parallax between the image-taking lens and the external distance-measuring unit 126. In this case, the process progresses to Step 320; the microcomputer 114 sets the TV-AF method for the AF method in the next AF control operation. Moreover, the process progresses from Step 322 to Step 302; the AF mode changes to the 'restart mode'.

On the other hand, if the change amount of the distance information is smaller than the predetermined amount, that is, zero or very small in Step 315, the process progresses to Step 316. In Step 316, the microcomputer 114 compares the current AF evaluation value that was taken in Step 314 with the previous AF evaluation value that was held in Step 313, as in Step 317, and judges whether the change amount of the AF evaluation value is larger than the predetermined amount (first predetermined amount) or not. If the change amount of the AF evaluation value is larger than the predetermined amount, the process progresses to Step 319; the microcomputer 114 sets the external distance-measuring method for the AF method in the next AF control operation.

Then, the process returns to Step 322; the 'restart mode' is performed from Step 323. At this time, since the distance information changes little, the microcomputer 114 controls the focus lens unit 105 so that the current position of the focus lens unit 105 may be almost held. This situation corresponds to the scene 2, in which panning or the like is performed for an equidistant object. In this situation, the object distance does not change, but the contrast of the object changes. Therefore, the situation is determined to be a situation in which the AF evaluation value has fluctuated because of the change of the object'contrast.

If the change amount of the AF evaluation value is smaller than the predetermined amount in Step 316, the process progresses to Step 321; the AF mode changes to a mode in which the position of the focus lens unit 105 is held, that is, the movement of the focus lens unit 105 is prohibited (in other words, the drive of the focus lens unit 105 is stopped). Then, the process returns to Step 314; the 'in-focus/restart judging process' is continued. This case corresponds to the scene 5, in which the contrast and distance of the object do not change.

The case that the process progresses to Step 323 via Steps 319 and 322 corresponds to the scenes 1, 2 and 4. If the microcomputer 114 selects the external distance-measuring method in Step 322, the process progresses to Step 323. In Step 323, the microcomputer 114 calculates an in-focus point (hereinafter, it is referred to as a distance-measured in-focus point) of the focus lens unit 105 based on the latest distance information taken in Step 324 while taking the AF evaluation value, and drives the focus lens unit 105 to the distance-measured in-focus point.

Next, in Step 325, the microcomputer 114 judges whether the focus lens unit 105 has reached the distance-measured in-focus point or not. If the focus lens unit 105 has not reached the distance-measured in-focus point, the process returns to Step 323; the microcomputer 114 waits for reaching.

Since the scene 1 is a situation in which the object distance change has surely occurred, the microcomputer 114 drives the focus lens unit 105 to the distance-measured in-focus point at a high speed as an AF restart operation, resulting in achieving the in-focus state rapidly. In addition, since the scene 2 is a situation in which the object distance change has been zero (or very small), the distance-measured in-focus point is approximately the same. Therefore, the microcomputer 114 almost holds the focus lens unit 105 at the position at the time of the judgment in Step 316. Furthermore, since the scene 4 is a situation in which the object distance has changed, the microcomputer 114 drives the focus lens unit 105, resulting in achieving the in-focus state rapidly, as in the scene 1.

If the focus lens unit 105 has reached the distance-measured in-focus point in Step 325, the microcomputer 114 takes the AF evaluation value again in Step 326, and judges whether the change amount that is the difference amount from the AF evaluation value taken and held in Step 323 is larger than the predetermined amount (first predetermined amount) or not in Step 327, as in Step 317.

If the change amount of the AF evaluation value is larger than the predetermined amount, the situation corresponds to the scene 2. Therefore, the microcomputer 114 performs the process from Step 323 for holding the position of the focus lens unit 105, continuing the focus control operation by the external distance-measuring method. If the fluctuation of the AF evaluation value becomes small because of a stable camerawork, the process progresses to Step 329 via Step 328; the microcomputer 114 sets the TV-AF method for the AF method in the next AF operation, and the AF mode changes to the 'in-focus confirming mode'.

In Step 328, the microcomputer 114 judges whether the level of the current AF evaluation value is smaller than the predetermined threshold or not as in Step 318. If the level of the current AF evaluation value is smaller than the threshold, the microcomputer 114 judges that it is the scene 4, and returns to Step 323, continuing the focus control operation by the external distance-measuring method.

When the object changes to an object with a contrast larger than a certain degree, since the level of the AF evaluation value becomes larger than the predetermined threshold in Step 328, the process progresses to Step 329. In Step 329, the microcomputer 114 sets the TV-AF method for the AF method in the next AF control operation as described above, and changes the AF mode to the 'in-focus confirming mode'.

As explained above, in the embodiment, the AF method is selected so that weaknesses of the TV-AF method and the external distance-measuring method may be compensated for each other, based on the change amount of the AF evaluation value and the change amount of the distance information, that is, according to the change of image-taking situations. Therefore, it is possible to reduce the possibility of false focus control. In particular, it becomes possible to prevent false operations caused by the parallax between the image-taking lens and external distance-measuring unit 126.

In addition, it becomes possible to achieve operations for natural focusing in all image-taking scenes by selecting a mode in which the position of the focus lens unit 105 is held and a mode in which the position of the focus lens unit 105 is changed (that is, the focus control is performed) in accordance with image-taking scenes.

These operations make it possible to move the focus lens unit 105 to the in-focus position rapidly, and to prevent the movement of the focus lens unit 105 in a false direction and the suspension of the movement of the focus lens unit 105 in a state in which there is image blur. Therefore, it becomes possible to perform auto focus operations at high speeds and with high accuracy.

Hereinafter, further explanations for the process in the 'minute drive operation' and 'mountaineering drive operation' according to the focus control program in the microcomputer 114 will be given.

Figure 6A:
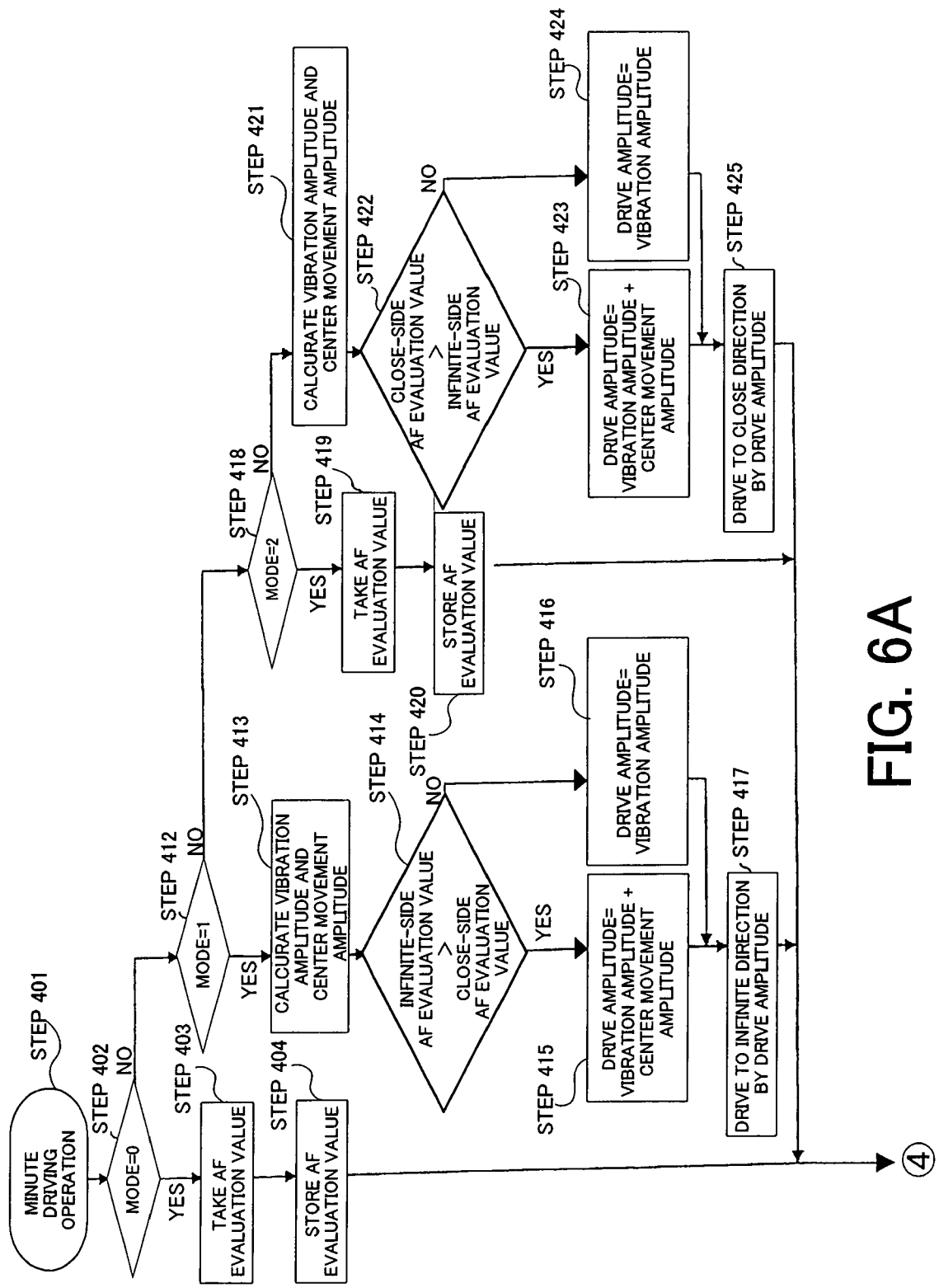
FIGS. 6A and 6B are flowcharts showing AF control in the video camera of Embodiment 1.
Figure 6B:
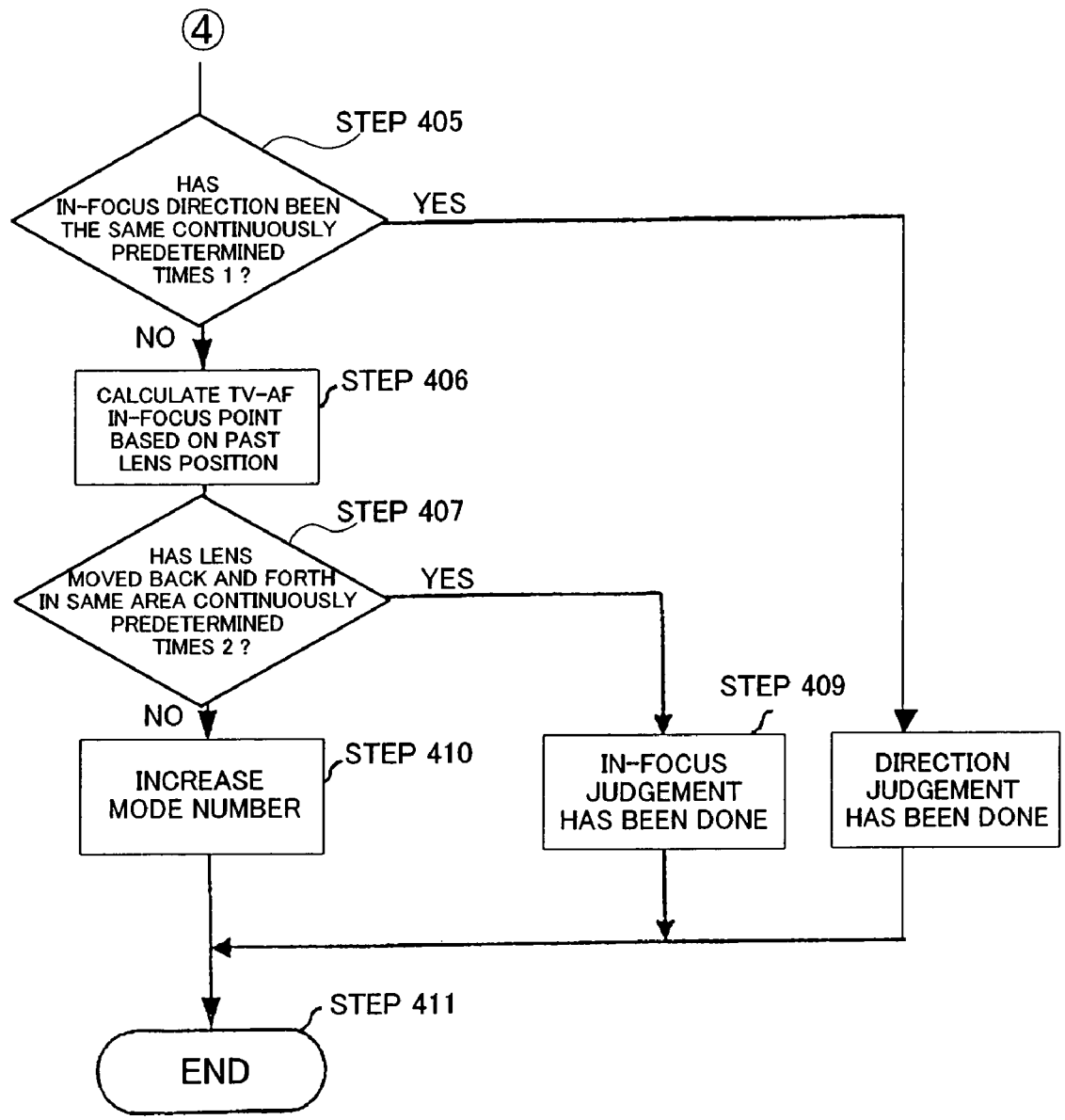
Figure 7:
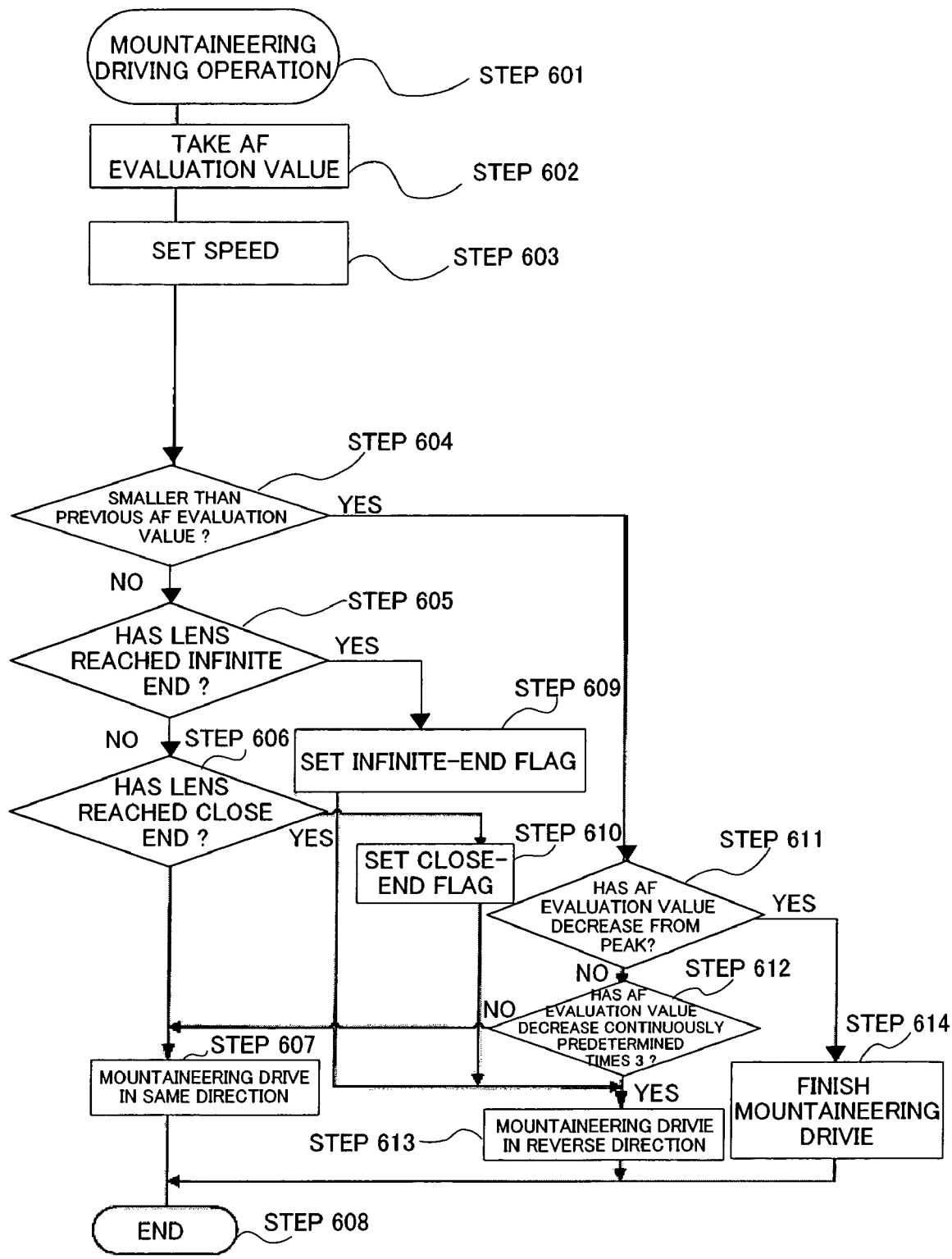
FIG. 7 is a flowchart showing AF control in the video camera of Embodiment 1.

First, the 'minute drive operation' will be explained using a flowchart in FIGS. 6A and 6B (hereinafter, they are merely referred to as FIG. 6).

The microcomputer 114 starts the process in Step 401, and judges whether the current mode number (Mode) is 0 or not in Step 402. The process progresses to Step 403 if the Mode is 0, and to Step 412 if the Mode is not 0.

[Process in the Case Where the Focus Lens Unit 105 is Located on the Close Side]

In Step 403, the microcomputer 114 takes the AF evaluation value from the AF signal processing circuit 113. This AF evaluation value was generated based on the video signals made from charges accumulated in the image-pickup element 106 when the focus lens unit 105 is located on the infinite side in the Mode of 2.

Next, in Step 404, the microcomputer 114 stores the AF evaluation value taken in Step 403 as an infinite-side AF evaluation value.

Next, in Step 405, the microcomputer 114 judges whether the directions that have judged to be the in-focus direction are continuously the same the first predetermined times (shown by 'predetermined times 1' in the figure) or not. The process progresses to Step 408 if it is yes, and to Step 406 if it is no.

In Step 406, the microcomputer 114 determines the average position of the focus lens unit 105 for the past-predetermined period to be an in-focus point.

In Step 407, the microcomputer 114 judges whether the focus lens unit 105 has moved back and forth in the same area the second predetermined times (shown by 'predetermined times 2' in the figure) or not. The process progresses to Step 409 if it is yes, that is, the focus lens unit 105 is located in the vicinity of the in-focus point, and the process progresses to Step 410 if it is no.

In Step 410, the microcomputer 114 increases the Mode (returns to 0 after the Mode has reached 3, changing it cyclically), and then the process progresses to Step 305 in FIG. 3.

In the process from Step 410 to Step 411, if the process shown in FIG. 6 is finished, the microcomputer 114 will determine that it is 'NO' in Steps 305 and 306 in FIG. 3, and then will continue the 'minute drive operation' in Step 302 (the process from Step 401 in FIG. 6) again.

On the other hand, in Step 408, the microcomputer 114 determines that the direction judgment has been done, and then the process progresses to Step 411 for finishing the process. In this case, the microcomputer 114 will determine that it is 'NO' in Step 305 in FIG. 3. In contrast, the microcomputer 114 will determine that it is 'YES' in Step 306, and then will perform the 'mountaineering drive operation'.

In Step 409, the microcomputer 114 determines that the in-focus judgment has been done, and then the process progresses to Step 411 for finishing the process. In this case, the microcomputer 114 will determine that it is 'YES' in Step 305 in FIG. 3, and then will perform the 'in-focus/restart judging process' from Step 311 in FIG. 3.

In Step 412, the microcomputer 114 judges whether the current Mode is 1 or not. The process progresses to Step 413 if it is yes; the microcomputer 114 performs the process for driving the focus lens unit 105 in the infinite direction. The process progresses to Step 418 if it is no in Step 412.

[Process for Driving the Focus Lens Unit 105 in the Infinite Direction]

In Step 413, the microcomputer 114 calculates a vibration amplitude and a center movement amplitude in the 'minute drive operation'. The amplitude is generally set to be small when the depth of focus is shallow, and to be large when the depth of focus is deep.

In Step 414, the microcomputer 114 compares the infinite-side AF evaluation value in the Mode=0, which was mentioned above, with a close-side AF evaluation value in the Mode=3, which will be mentioned later. The process progresses to Step 415 if the infinite-side AF evaluation value is larger than the close-side AF evaluation value, and to Step 416 if the infinite-side AF evaluation value is smaller than the close-side AF evaluation value.

In Step 415, the microcomputer 114 sets the sum of the vibration amplitude and center movement amplitude for a drive amplitude.

In Step 416, the microcomputer 114 sets the vibration amplitude for the drive amplitude.

In Step 417, the microcomputer 114 drives the focus lens unit 105 in the infinite direction with the amplitude set in Step 415 or Step 416, and then performs the process from Step 415 described above.

In Step 418, the microcomputer 114 judges whether the current Mode is 2 or not. The process progresses to Step 419 if it is yes. In Step 419, the microcomputer 114 performs a process corresponding to the case where the focus lens unit 105 is judged to be in the infinite side in the minute drive. On the other hand, in the case where the focus lens unit 105 is judged to be in the close side in the minute drive, the process progresses to Step 421.

[Process in the Case where the Focus Lens Unit 105 is Located on the Infinite Side]

In Step 419, the microcomputer 114 takes the AF evaluation value from the AF signal processing circuit 113. This AF evaluation value was generated based on the video signals made from charges accumulated in the image-pickup element 106 when the focus lens unit 105 is located on the close side and the Mode is 0.

Next, in Step 420, the microcomputer 114 stores the AF evaluation value taken in Step 419 as a close-side AF evaluation value. Then, the process progresses to Step 405 described above.

[Process for Driving the Focus Lens Unit 105 in the Close Direction]

In Step 421, the microcomputer 114 calculates a vibration amplitude and a center movement amplitude in the 'minute drive operation'. The amplitude is generally set to be small when the depth of focus is shallow, and to be large when the depth of focus is deep.

In Step 422, the microcomputer 114 compares the infinite-side AF evaluation value in the Mode=0, which was mentioned above, with a close-side AF evaluation value in the Mode=3, which was mentioned above. The process progresses to Step 423 if the close-side AF evaluation value is larger than the infinite-side AF evaluation value, and to Step 424 if the close-side AF evaluation value is smaller than the infinite-side AF evaluation value.

In Step 423, the microcomputer 114 sets the sum of the vibration amplitude and center movement amplitude for the drive amplitude.

In Step 424, the microcomputer 114 sets the vibration amplitude for the drive amplitude.

Next, in Step 425, the microcomputer 114 drives the focus lens unit 105 in the close direction with the amplitude set in Step 423 or Step 424, and then performs the process from Step 405 described above.

Figure 8:
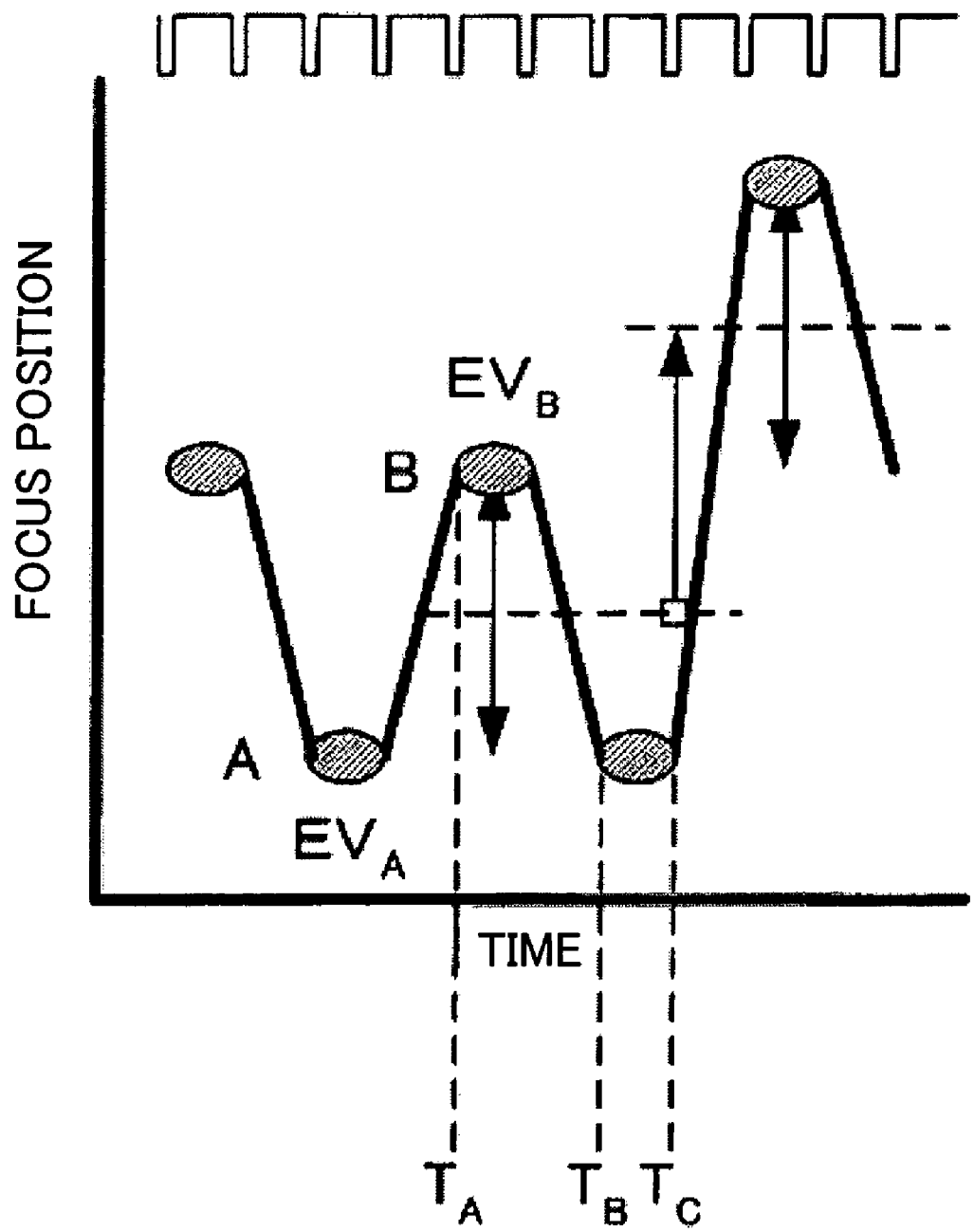
FIG. 8 is a figure for explaining the outline of a minute drive of the focus lens unit of AF control.

FIG. 8 shows the movement of the focus lens unit 105 with time. The horizontal axis shows time, and the vertical axis shows the focus position. In addition, the downward-convex portions of the pulse wave shown in the upper part in FIG. 8 show synchronization signals of video signals.

In FIG. 8, the AF evaluation value EVA for charges (shown by a hatched ellipse) accumulated in the image-pickup element 106 during a period A is taken at the time TA, and the AF evaluation value EVB for charges accumulated in the image-pickup element 106 during a period B is taken at the time TB. The AF evaluation values EVA and EVB are compared with each other at the time TC. If the AF evaluation value EVB is larger than the AF evaluation value EVA, the vibration center is moved (the drive amplitude=the vibration amplitude+the center movement amplitude). On the other side, if the AF evaluation value EVA is larger than the AF evaluation value EVB, the vibration center is not moved (the drive amplitude=the vibration amplitude).

Next, the explanation for the process in the 'mountaineering drive operation' according to the focus control program in the microcomputer 114 will be given.

The microcomputer 114 starts the process in Step 601, and takes the AF evaluation value takes from the AF signal processing circuit 113 in Step 602.

Next, in Step 603, the microcomputer 114 sets the mountaineering drive speed. The speed is generally set to be small when the depth of field is shallow, and to be large when the depth of field is deep.

Next, in Step 604, the microcomputer 114 judges whether the AF evaluation value taken in Step 602 is smaller than the previous AF evaluation value by a predetermined amount or not. The process progresses to Step 605 if it is no, and to Step 611 if it is yes. The predetermined amount is determined in consideration of the S/N ratio of the AF evaluation value, and is set to an amount more than the change width of the AF evaluation value in a state in which the object and the position of the focus lens unit 105 are fixed, respectively, otherwise it is impossible to perform the mountaineering drive in the correct direction because of affects of the fluctuation of the AF evaluation value. In Step 605, the microcomputer 114 judges whether the focus lens unit 105 has reached the infinite end. The infinite end in the embodiment is the most infinite side position in the movable range of the focus lens unit 105, which is set in design. The process progresses to Step 609 if the focus lens unit 105 has reached the infinite end, and to Step 606 if the focus lens unit 105 has not reached.

In Step 606, the microcomputer 114 judges whether the focus lens unit 105 has reached the close end. The close end in the embodiment is the most close side position in the movable range of the focus lens unit 105, which is set in design. The process progresses to Step 610 if the focus lens unit 105 has reached the close end, and to Step 607 if the focus lens unit 105 has not reached there.

In Step 609, the microcomputer 114 set a flag showing the infinite end. In Step 610, the microcomputer 114 set a flag showing the close end. The process progresses to Step 613 from Steps 609 and 610.

In Step 613, the microcomputer 114 continues the mountaineering drive of the focus lens unit 105 in the direction opposite to the end shown by the above-mentioned flag.

In Step 607, the microcomputer 114 continues the mountaineering drive of the focus lens unit 105 in the same direction as in the last time at a predetermined speed. Then, the process progresses to the Step 608, finishing the 'mountaineering drive operation' process.

In Step 611, the microcomputer 114 judges whether the AF evaluation value has decreased over the peak (see FIG. 5) or not. The process progresses to the Step 612 if the AF evaluation value has not decreased over the peak. On the other hand, the process progresses to the Step 614 if the AF evaluation value has decreased over the peak, finishing the mountaineering drive. Then, the process progresses to the Step 608, finishing the 'mountaineering drive operation' process and starting the 'minute drive operation' process.

In Step 612, the microcomputer 114 judges whether the AF evaluation value has decreased continuously the third predetermined times (shown by 'predetermined times 3' in the figure) or not. The process progresses to Step 613 if it is yes, and to Step 607 if it is no. In Step 607, the microcomputer 114 performs the mountaineering drive of the focus lens unit 105 in the same direction as in the last time at the predetermined speed. Then, the process progresses to the Step 608, finishing the 'mountaineering drive operation' process.

In Step 613, the microcomputer 114 performs the mountaineering drive of the focus lens unit 105 in the direction opposite to that in the last time at the predetermined speed. Then, the process progresses to the Step 608, finishing the 'mountaineering drive operation' process.

Figure 5:
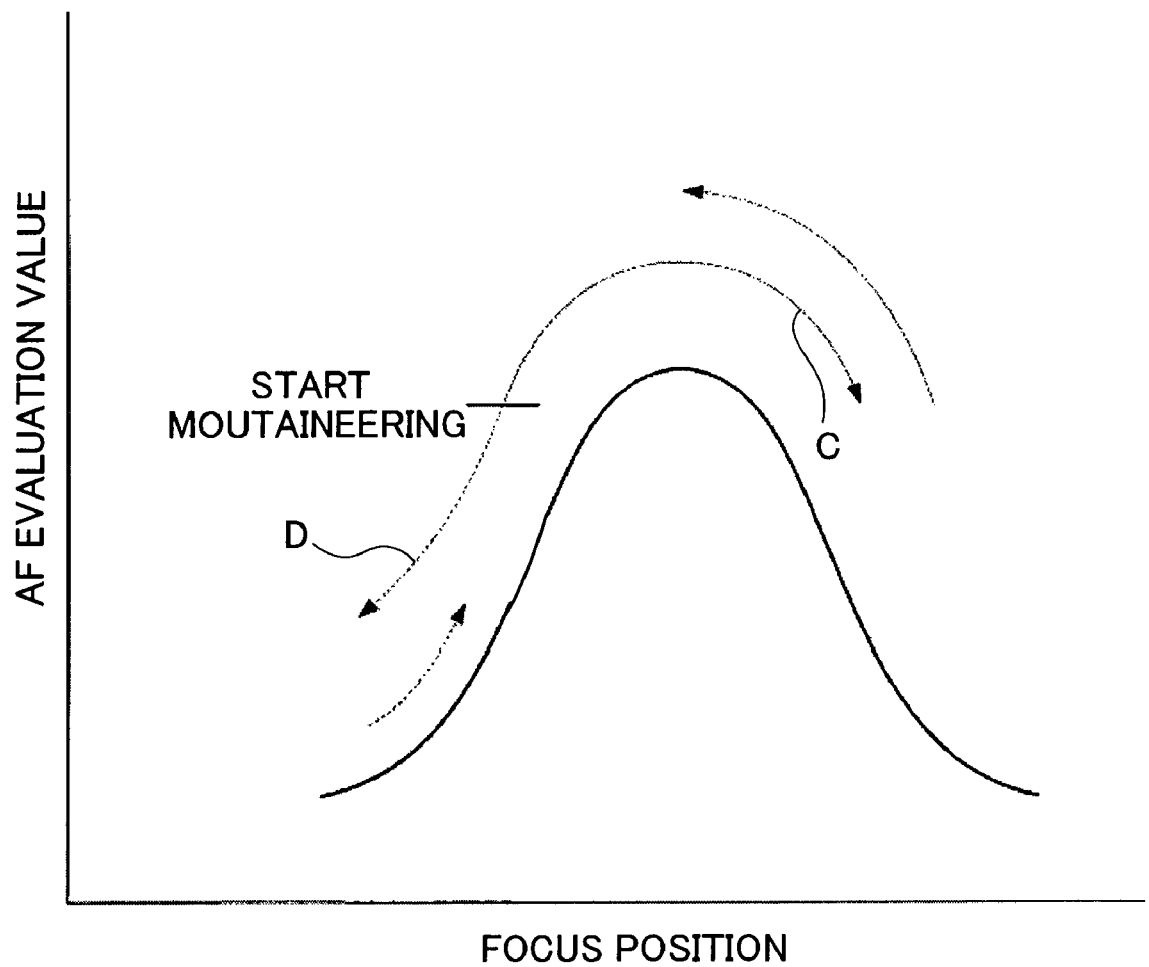
FIG. 5 is a figure for explaining the outline of a mountaineering drive of the focus lens unit of AF control.

FIG. 5 shows the movement of the focus lens unit 105 at the time of the mountaineering drive mentioned above. The vertical axis shows the AF evaluation value, and the horizontal axis shows the focus position. The arrow C shows that the AF evaluation value decreases over the peak. In this case, the mountaineering drive is finished because the focus lens unit 105 has passed over the in-focus point. On the other hand, the arrow D shows that the AF evaluation value decreases without exceeding the peak. In this case, the mountaineering drive is continued after the direction is switched because of a mistake in direction.

Embodiment 2

Figure 9:
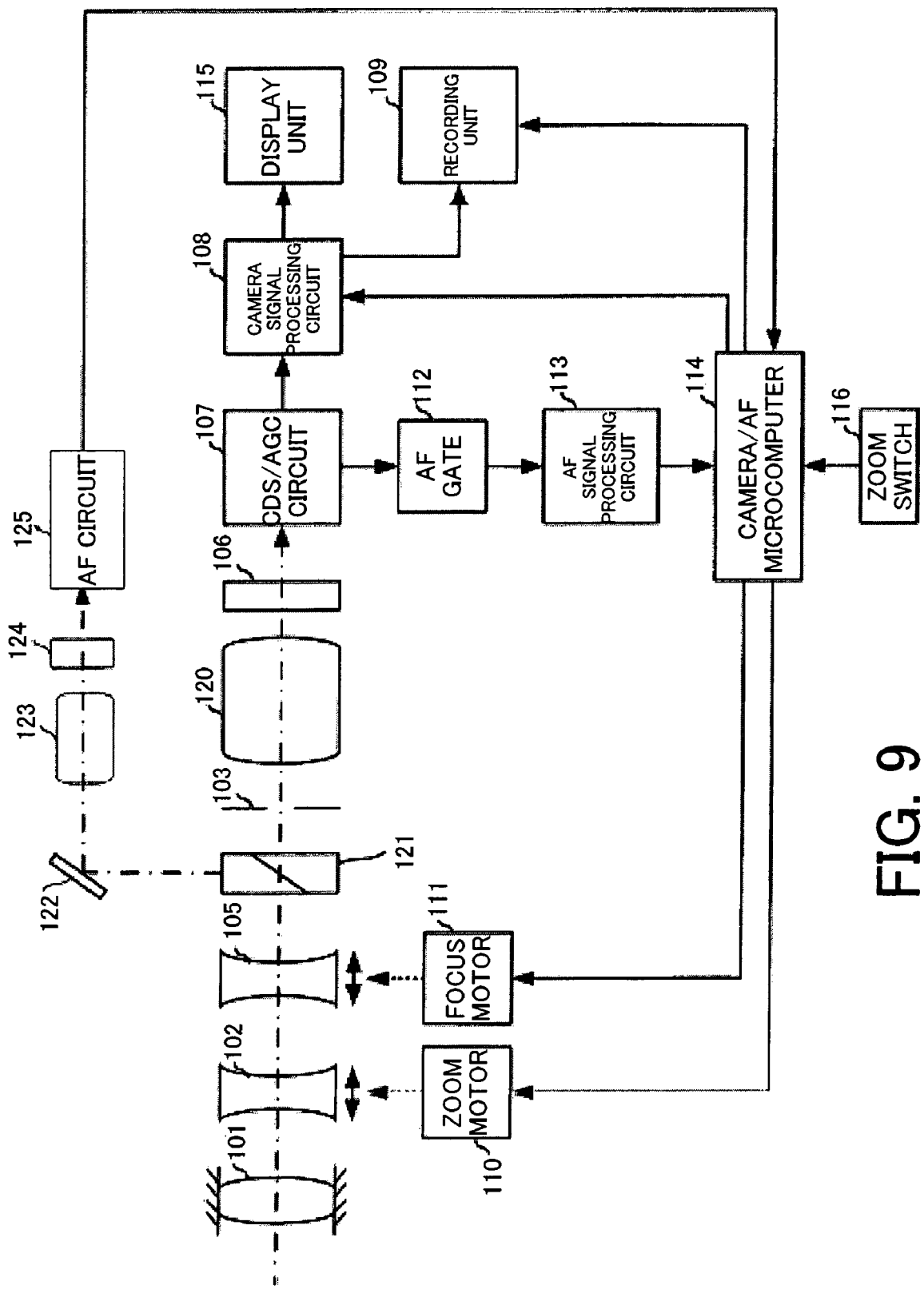
FIG. 9 is a block diagram showing the structure of a video camera that is Embodiment 2 of the present invention.

FIG. 9 shows the structure of a video camera as an image-taking apparatus that is Embodiment 2 of the present invention. In this embodiment, the same reference numerals are used for the constituents common to Embodiment 1, and explanations thereof are omitted.

In above-mentioned Embodiment 1, a video camera performing the second focus control operation with the external distance-measuring method was explained. In contrast, in this embodiment, a video camera performing a second focus control operation with a TTL (Through the Taking-Lens) phase difference detecting method, that is, an internal phase difference detecting method will be explained.

In FIG. 9, an image-taking lens is constituted by, in order from an object side (the left side in the figure), a first lens unit 101, a magnification-varying lens unit 102, a focus lens unit (focus/compensator lens unit) 105, a stop 103, and an image-forming lens unit 120. The image-forming lens unit 120 is arranged between the stop 103 and an image-pickup element 106.

The reference numeral 121 denotes a half prism dividing light for auto focus, which is arranged between the focus lens unit 105 and the stop 103. The reference numeral 122 denotes a sub mirror reflecting the luminous flux from the half prism 121, 123 denotes an AF image-forming lens forming an image of the light from the sub mirror 122. The reference numeral 125 denotes an AF circuit, which is a second signal generating section, with line sensors (AF sensors) 124 for the phase difference detecting method.

The microcomputer 114 detects an out-of-focus amount (defocus amount) and out-of-focus direction (defocus direction) of the image-taking lens based on the output from the AF sensors 124 via the AF circuit 125.

In the video camera with such a structure, the stop 103 operates actually during moving image-taking. Therefore, it is necessary to divide the luminous flux that entered the image-taking lens with the half prism 121 on the front side of the stop 103.

Figure 10A:
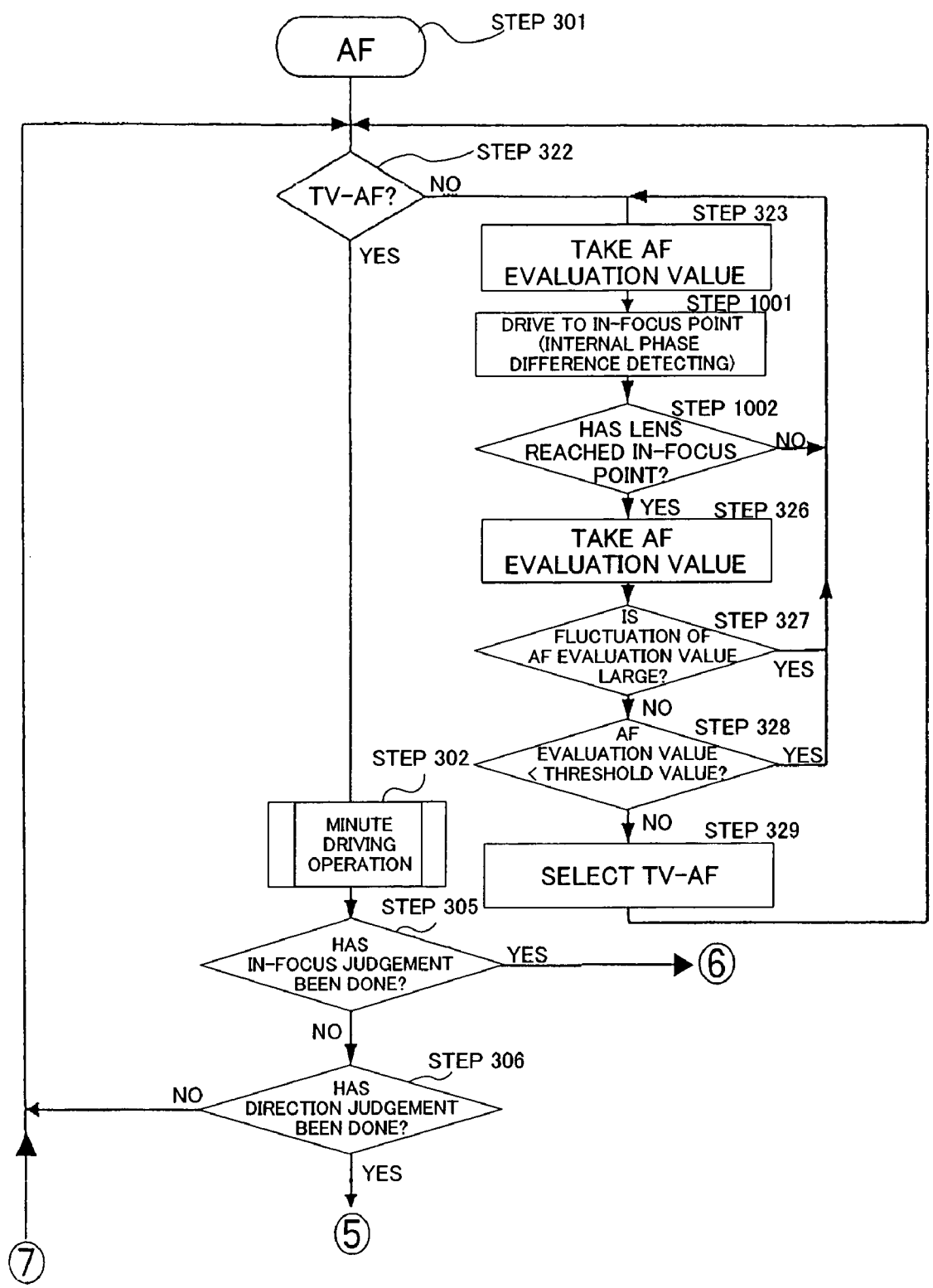
FIGS. 10A and 10B are flowcharts showing AF control in the video camera of Embodiment 2.
Figure 10B:
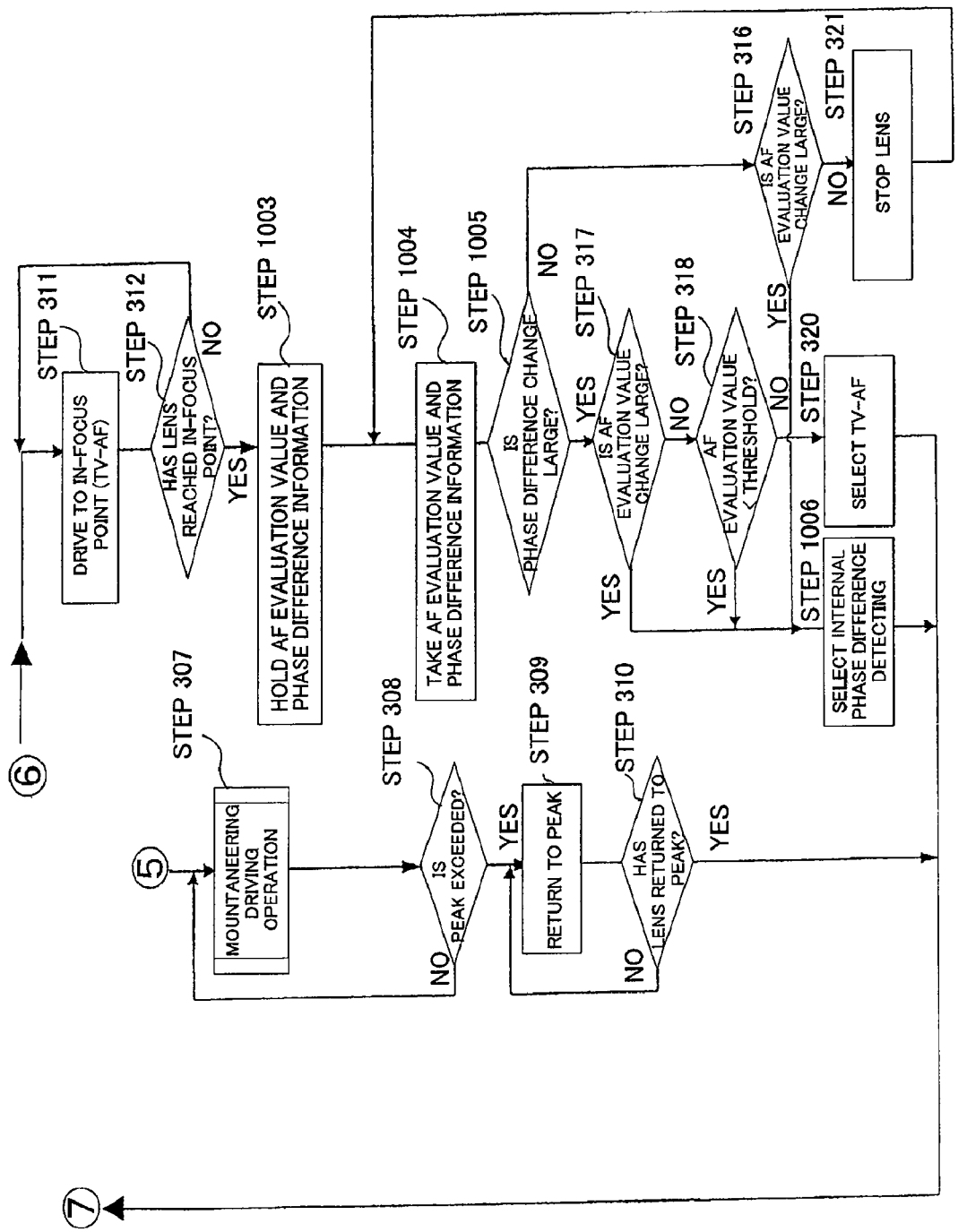

An AF control algorithm similar to that of Embodiment 1 can be applied to this embodiment. FIGS. 10A and 10B (hereinafter, it is merely referred to as FIG. 10) show a flowchart indicating the feature of the embodiment.

This flowchart is used in place of the flowchart in FIG. 3 for Embodiment 1; the same symbols as in FIG. 3 are applied to the common steps in this flowchart.

In FIG. 3, the distance information is used in Steps 324, 325, 313, 314, 315 and 319. In contrast, in FIG. 10, the internal out-of-focus information (defocus amount and defocus direction) is used in Steps 1001, 1002, 1003, 1004, 1005 and 1006. This is the only difference between the flowcharts in FIGS. 3 and 10.

In the embodiment, the AF method is selected so that weaknesses of the TV-AF method and the internal phase difference detecting method may be compensated for each other, based on the change amount of the AF evaluation value and the change amount of the internal out-of-focus information, that is, according to the change of image-taking situations. Therefore, it is possible to reduce the possibility of false focus control.

In addition, it becomes possible to achieve operations for natural focusing in all image-taking scenes by selecting a mode in which the position of the focus lens unit 105 is held and a mode in which the position of the focus lens unit 105 is changed (that is, the focus control is performed) in accordance with image-taking scenes.

These operations make it possible to move the focus lens unit 105 to the in-focus position rapidly, and to prevent the movement of the focus lens unit 105 in a false direction and the suspension of the movement of the focus lens unit 105 in a state in which there is image blur. Therefore, it becomes possible to perform auto focus operations at high speeds and with high accuracy.

According to each embodiment described above, the optimal AF method can be selected based on the changes of the first and second signals corresponding to the changes of the object and image-taking situations. Therefore, it is possible to reduce the possibility of inadequate focus control such as driving a focus lens in a false direction, causing unnecessary image blur and stopping a focus lens in an image-blurred state.

This application claims priority from Japanese Patent Application No. 2004-044758 filed on Feb. 20, 2004, which is hereby incorporated by reference herein.

What is claimed is:

1. A lens controlling apparatus, which performs a focus control operation for an image-taking optical system, comprising:
   a first signal generating section, which generates a first signal showing a contrast state of an object image on the basis of a predetermined frequency component of a signal;
   a second signal generating section, which generates a second signal by a focus detecting method different from that in the first signal generating section; and
   a controller, which selectively performs a first focus control operation based on the first signal and a second focus control operation based on the second signal,
   wherein the controller selects the second focus control operation in a case where a change amount of the first signal is larger than a first predetermined amount and a change amount of the second signal is larger than a second predetermined amount.

2. A lens controlling apparatus, which performs a focus control operation for an image-taking optical system, comprising:
   a first signal generating section, which generates a first signal showing a contrast state of an object image on the basis of a predetermined frequency component of a signal;
   a second signal generating section, which generates a second signal by a focus detecting method different from that in the first signal generating section; and
   a controller, which selectively performs a first focus control operation based on the first signal and a second focus control operation based on the second signal,
   wherein the controller selects one of the first and second focus control operations in accordance with a value of the first signal, in a case where a change amount of the first signal is smaller than a first predetermined amount and a change amount of the second signal is larger than a second predetermined amount.

3. The lens controlling apparatus according to claim 2, wherein the controller selects, in a case where the change amount of the first signal is smaller than the first predetermined amount and the change amount of the second signal is larger than the second predetermined amount, the first focus control operation when the value of the first signal is larger than a predetermined value, and the second focus control operation when the value of the first signal is smaller than the predetermined value.

4. A lens controlling apparatus, which performs a focus control operation for an image-taking optical system, comprising:
   a first signal generating section, which generates a first signal showing a contrast state of an object image on the basis of a predetermined frequency component of a signal;
   a second signal generating section, which generates a second signal by a focus detecting method different from that in the first signal generating section; and
   a controller, which selectively performs a first focus control operation based on the first signal and a second focus control operation based on the second signal, wherein the controller selects the second control operation in a case where a change amount of the first signal is larger than a first predetermined amount and a change amount of the second signal is smaller than a second predetermined amount.

5. An image-taking apparatus comprising:

an image-pickup element, which photoelectrically converts an object image formed by an image-taking optical system; and the lens controlling apparatus according to claim 1.

6. An image-taking apparatus comprising:

an image-pickup element, which photoelectrically converts an object image formed by an image-taking optical system; and the lens controlling apparatus according to claim 2.

7. An image-taking apparatus comprising:

an image-pickup element, which photoelectrically converts an object image formed by an image-taking optical system; and the lens controlling apparatus according to claim 4.

* * * * *